United States Patent
Kawagoe et al.

(10) Patent No.: US 9,902,007 B2
(45) Date of Patent: Feb. 27, 2018

(54) METHOD AND APPARATUS FOR ARC WELDING BY CONTROLLING WELDING CURRENT

(71) Applicant: DENSO CORPORATION, Kariya, Aichi-pref. (JP)

(72) Inventors: Tadashi Kawagoe, Obu (JP); Kazuyoshi Suzuki, Chita-gun (JP)

(73) Assignee: DENSO CORPORATION, Kariya (JP)

( * ) Notice: Subject to any disclaimer, the term of this patent is extended or adjusted under 35 U.S.C. 154(b) by 332 days.

(21) Appl. No.: 14/245,201

(22) Filed: Apr. 4, 2014

(65) Prior Publication Data

US 2014/0299588 A1 Oct. 9, 2014

(30) Foreign Application Priority Data

Apr. 5, 2013 (JP) .................. 2013-079425

(51) Int. Cl.
*B23K 9/09* (2006.01)
*B23K 9/007* (2006.01)

(52) U.S. Cl.
CPC .............. *B23K 9/09* (2013.01); *B23K 9/007* (2013.01)

(58) Field of Classification Search
CPC .......... B23K 9/007; B23K 9/09; B23K 9/092; B23K 9/095
See application file for complete search history.

(56) References Cited

U.S. PATENT DOCUMENTS

2011/0248007 A1  10/2011  Takeda et al.

FOREIGN PATENT DOCUMENTS

| JP | A-2002-1534 | 1/2002 |
| JP | 2011-218387 A | 11/2011 |
| JP | 2013-099755 A | 5/2013 |

OTHER PUBLICATIONS

Feb. 10, 2015 Office Action issued in Japanese Patent Application No. 2013-079425.

*Primary Examiner* — Christopher Kim
(74) *Attorney, Agent, or Firm* — Oliff PLC

(57) ABSTRACT

A method for performing arc welding includes steps of: preparing two work pieces each having fused portion, being butted against one another; preparing a welding electrode which is a non-consumable type electrode used for performing arc welding to the two work pieces, the welding electrode being disposed to face the two work pieces; applying welding current to the welding electrode so as to have the two work pieces welded; and performing a current changing step to change an amount of the welding current to be decreased so as to have a fused portion of at least one of the two work pieces move toward the other work piece for adhesion to the fused portion of the other work piece or for adhesion to the other work piece itself.

14 Claims, 4 Drawing Sheets

METHOD AND APPARATUS FOR ARC WELDING BY CONTROLLING WELDING CURRENT

CROSS-REFERENCE TO RELATED APPLICATION

This application is based on and claims the benefit of priority from earlier Japanese Patent Application No. 2013-079425 filed Apr. 5, 2013, the description of which is incorporated herein by reference.

BACKGROUND

Technical Field

The present disclosure relates to a method and an apparatus for arc welding.

Related Art

A patent document JP-A-2002-001534 discloses a welding method and a welding apparatus, in which upper portions of base metals which are horizontally butted against one another are joined using TIG (tungsten inert gas) welding.

In the welding method and apparatus based on the conventional art as set forth above, separated fusion may occur. The separated fusion refers to a defect in which base metals do not fuse with each other.

There are two main cases in the separated fusion. The first case is that both of the base metals are fused but the fused portions are separated from each other. The second case is that only one of the base metals is fused.

A cause of the first case could be that there is a large vertical step between the base metals or there is a large horizontal gap between the base metals. A cause of the second case could be that the base metals are not in good contact with the ground electrodes.

SUMMARY

The embodiment provides a method and an apparatus that effectively suppress separated fusion in the arc welding.

As an aspect of the present disclosure, the method for performing arc welding includes steps of: preparing two work pieces each having an upper portion located at an upper end thereof with respect to a vertical direction, two upper portions of the two work pieces being butted against one another in a horizontal direction that is perpendicular to the vertical direction; preparing a welding electrode which is a non-consumable type electrode used for performing arc welding to the two work pieces, the welding electrode being disposed to face the two work pieces; applying welding current to the welding electrode so as to have the two work pieces welded; and performing a current changing step to change an amount of the welding current to be decreased so as to have a fused portion included in the upper portion of at least one of the two work pieces move toward the other work piece for adhesion to the fused portion of the other work piece or for adhesion to the other work piece itself.

According to the method described above, by performing the current changing steps, the two work pieces are bridged by the fused portions. Accordingly, the occurrence of separated fusion is minimized.

As an another aspect of the present disclosure, the apparatus for performing arc welding includes: a non-consumable type welding electrode; a welding power source that supplies welding current to the non-consumable type welding electrode so as to have two work pieces welded; and a control unit that controls the welding current. Each of the two work pieces has a portion including a fused portion to be welded, and portions of the two work pieces are butted against one another. The control unit changes an amount of the welding current to be decreased so as to have the fused portion of at least one of the two work pieces move toward the other work piece for adhesion to the fused portion of the other work piece or for adhesion to the other work piece itself.

According to the apparatus of the present disclosure as describe above, the control unit performs the current changing controls to allow the fused portions to bridge the two work pieces. Accordingly, the occurrence of separated fusion is minimized.

The reference symbols in brackets for the elements set forth above or in the claims indicate correlation of the elements to the specific means described in the embodiments provided below.

DETAILED DESCRIPTION OF THE PREFERRED EMBODIMENTS

Figure 1:
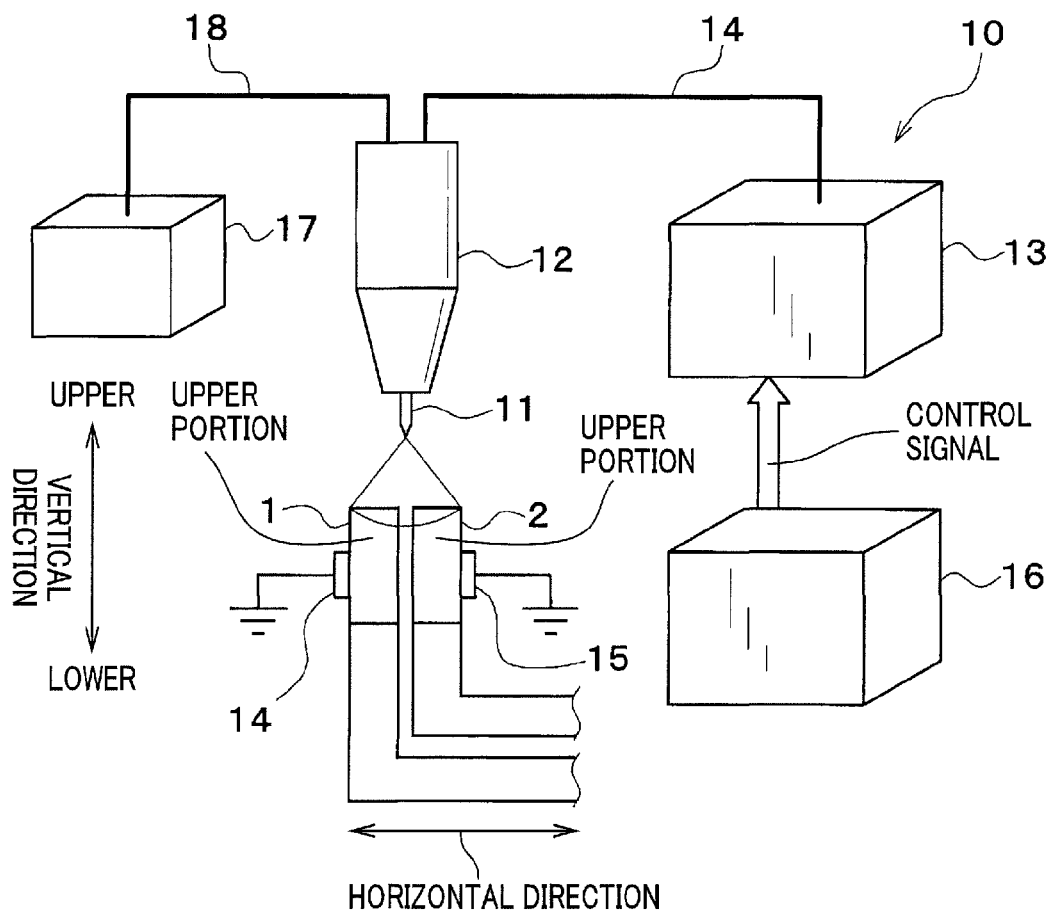
FIG. 1 is a schematic diagram generally illustrating an arc welding apparatus according to a first embodiment of the present disclosure.

With reference to the accompanying drawings, hereinafter are described some embodiments of the present disclosure. In the description of the embodiments provided below, the components identical with or similar to each other between the embodiments are given the same reference numerals for the sake of omitting unnecessary explanation.

First Embodiment

Referring first to FIGS. 1 to 7 hereinafter is described an arc welding method and an arc welding apparatus according to a first embodiment of the present disclosure. FIG. 1 is a schematic diagram generally illustrating an arc welding apparatus 10 according to the first embodiment. The arc welding apparatus 10 shown in FIG. 1 is a non-consumable electrode type arc welding apparatus that includes a welding electrode 11. The non-consumable electrode type arc welding apparatus is an arc welding apparatus that performs arc welding using a non-consumable electrode as the welding electrode 11.

Specifically, the arc welding apparatus 10 is a TIG (tungsten inert gas) welding apparatus that performs TIG welding. The TIG welding is a welding that uses tungsten as the welding electrode 11 and an inert gas as shielding gas.

Besides the welding electrode 11, the arc welding apparatus 10 also includes a torch 12, welding power source 13, ground electrodes 14 and 15, control unit 16, shielding gas supply unit 17, gas piping 18 and conductor 19. The welding electrode 11 is held by the torch 12 and electrically connected to the welding power source 13 via the conductor 19. The welding power source 13 corresponds to a voltage applying means that applies voltage across the welding electrode 11 and two work pieces (i.e., base metals) 1 and 2.

The welding power source 13 is a direct-current type welding power source that supplies direct-current welding current. The welding power source 13 is supplied with three-phase alternating-current power from a commercial power source. The welding power source 13 rectifies the three-phase alternating current for conversion into direct current. For example, a direct-current inverter type welding power source is used as the welding power source 13.

The two work pieces 1 and 2 are fixed such as to a jig (not shown) in a state of being horizontally butted against one another. The work pieces 1 and 2 are copper coils used for an SC (segment conductor) alternator. The work pieces 1 and 2 are each formed of oxygen-free copper. The work pieces 1 and 2 are electrically connected to the ground electrodes 14 and 15, respectively.

The welding power source 13 is electrically connected to the control unit 16. The control unit 16 serves as a control means that controls welding current and thus outputs a control signal to the welding power source 13.

The torch 12 is connected to the shielding gas supply unit 17 via the gas piping 18. The shielding gas supply unit 17 serves as a shielding gas supply means that supplies shielding gas to the torch 12. The shielding gas supplied to the torch 12 from the shielding gas supply unit 17 is blown toward the work pieces 1 and 2 from around the welding electrode 11.

Figure 2:
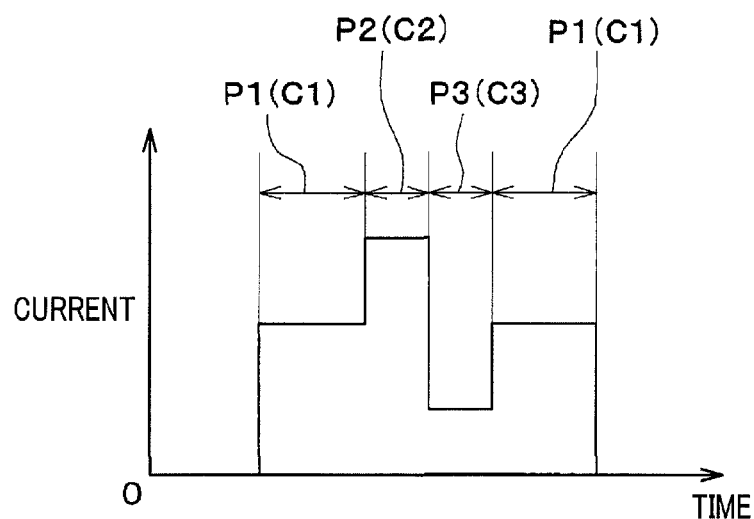
FIG. 2 is a current waveform diagram illustrating a control waveform that controls welding current by the arc welding apparatus.

The control unit 16 controls the welding power source 13 such that a welding current waveform will turn to a control waveform as shown in FIG. 2. As the state of the welding current transitions as shown in FIG. 2, welding steps are carried out in order of constant current step P1→current rise step P2→current drop step P3→constant current step P1.

At the constant current step P1, the welding current is substantially made constant. At the current rise step P2, the welding current is raised. At the current drop step P3, the welding current is lowered. Specifically, the control unit 16 performs constant current control C1 at the constant current step P1 so that the welding current is substantially kept constant, performs current rise control C2 at the current rise step P2 so that the welding current is increased, and performs current drop control C3 at the current drop step P3 so that the welding current is decreased.

The current rise step P2 and the current drop step P3 each correspond to a current changing step at which the amount of welding current is changed. In other words, at the current changing steps P2 and P3, the control unit 16 performs the current changing controls C2 and C3, respectively, so that the amount of welding current will be changed.

At the current rise step P2 and the current drop step P3, the control unit 16 shapes the control waveform into a rectangular wave. In the transition from the current rise step P2 to the current drop step P3, the control unit 16 allows drastic drop of the welding current. In other words, the control unit 16 significantly drops the welding current in a very short time (e.g., about 1 to 10 ms).

At the current rise step P2 and the current drop step P3, the control unit 16 allows the control waveform to be symmetric between these steps. Accordingly, the increase in the amount of heat input at the current rise step P2 is cancelled by the decrease in the amount of heat input at the current drop step P3.

Referring to FIGS. 3 to 6, hereinafter are described welding behaviors exhibited by passing the welding current that has the control waveform as shown in FIG. 2. Upon application of a voltage across the welding electrode 11 and the work pieces 1 and 2, the welding current is permitted to pass therebetween. Then, an arc is generated between the welding electrode 11 and the work pieces 1 and 2. The large quantity of heat generated by the arc fuses the heads of the work pieces 1 and 2.

Figure 3:
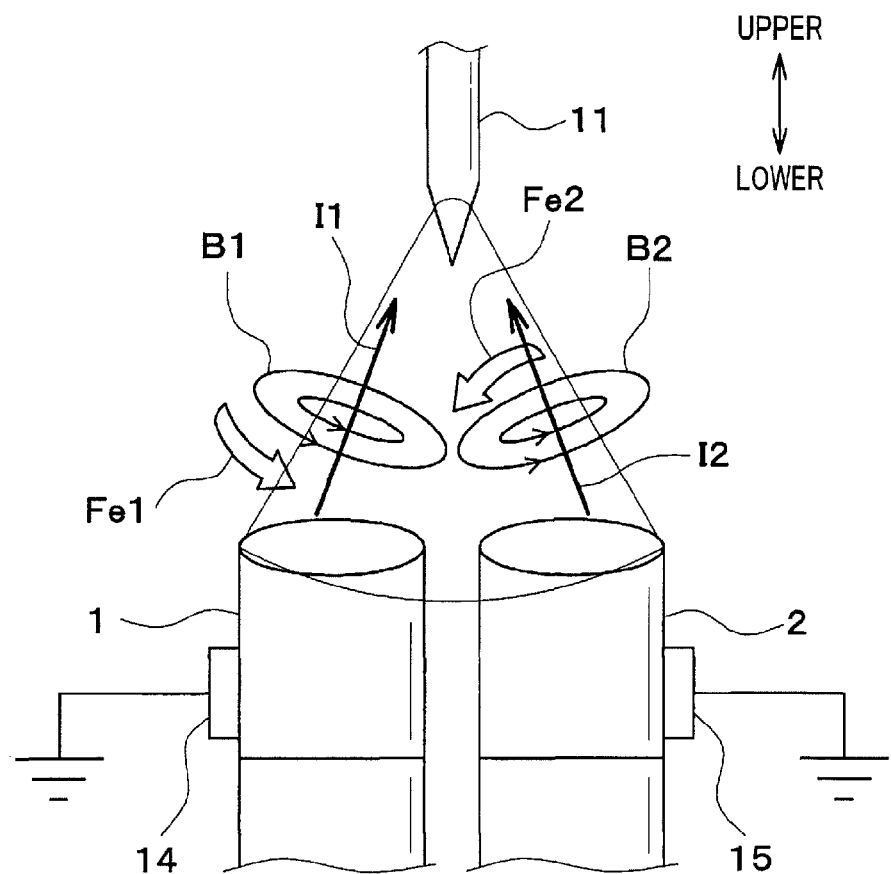
FIG. 3 is an explanatory diagram illustrating welding behaviors when welding current is supplied.

In this case, as shown in FIG. 3, when the heads of the work pieces 1 and 2 are spaced apart from each other, welding current I1 is passed between the welding electrode 11 and the work piece 1, while welding current I2 is passed between the welding electrode 11 and the work piece 2. Thus, the welding currents I1 and I2 generate magnetic fields B1 and B2, respectively, and further generate electromagnetic forces Fe1 and Fe2, respectively.

Figure 4:
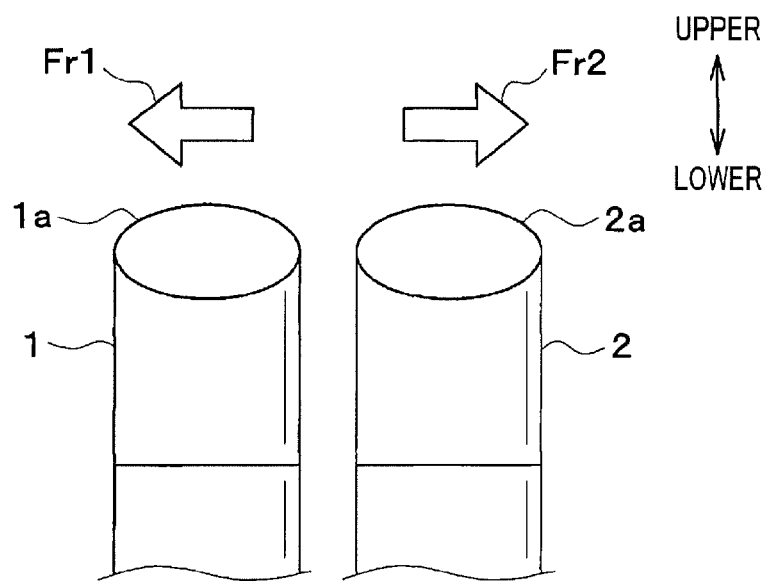
FIG. 4 is an explanatory diagram illustrating welding behaviors at an initial constant current step P1.

Therefore, as shown in FIG. 4, at the initial constant current step P1, repulsive forces Fr1 and Fr2 will act on fused portions 1a and 2a, respectively, in directions that the fused portions 1a and 2a will depart from each other. In other words, a repulsive force acts on the fused portion of one work piece in a direction of departing from the other work piece. In this case, the fused portions 1a and 2a will stay on the work pieces 1 and 2, respectively, due to the effect of surface tension.

FIG. 4 shows a state where the fused portions 1a and 2a are formed on the work pieces 1 and 2, respectively. However, such a fused portion may sometimes be formed on only one work piece. A cause of forming the fused portion on only one work piece may be that, for example, there is a vertical step between the heads of the work pieces 1 and 2.

Figure 5:
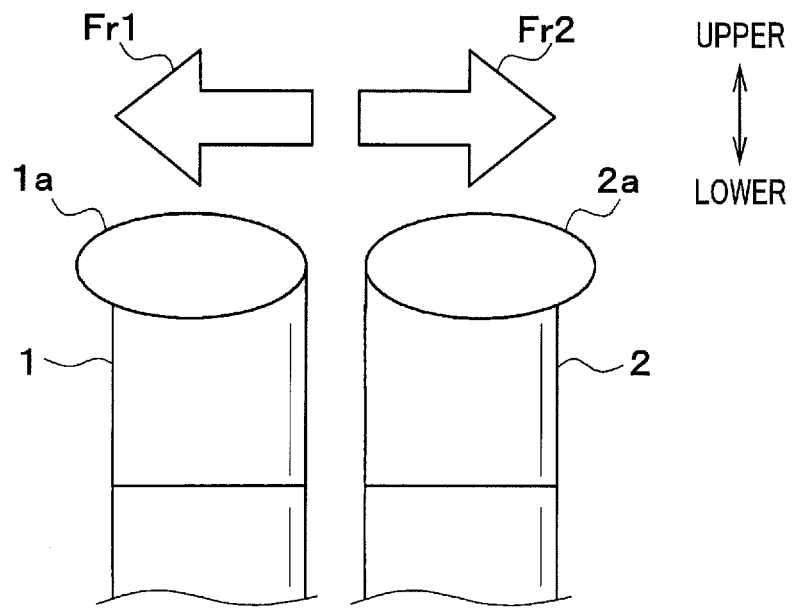
FIG. 5 is an explanatory diagram illustrating welding behaviors at a current rise step P2.

As shown in FIG. 5, since the welding current rises at the current rise step P2 compared to the constant current step P1, the electromagnetic forces are increased. Accordingly, the repulsive forces Fr1 and Fr2 acting on the fused portions 1a and 2a, respectively, are also increased. Thus, the fused portions 1a and 2a move so as to depart from each other. In other words, the fused portion on one work piece moves so as to depart from the other work piece.

If the repulsive forces Fr1 and Fr2 acting on the fused portions 1a and 2a, respectively, are excessively large, the fused portions 1a and 2a would make overcome the effect of surface tension and would drip off from the work pieces 1 and 2. Therefore, the welding current is set to a level of generating the repulsive forces Fr1 and Fr2 which will allow the fused portions 1a and 2a to stay on the work pieces 1 and 2, respectively, by the effect of surface tension.

Figure 6:
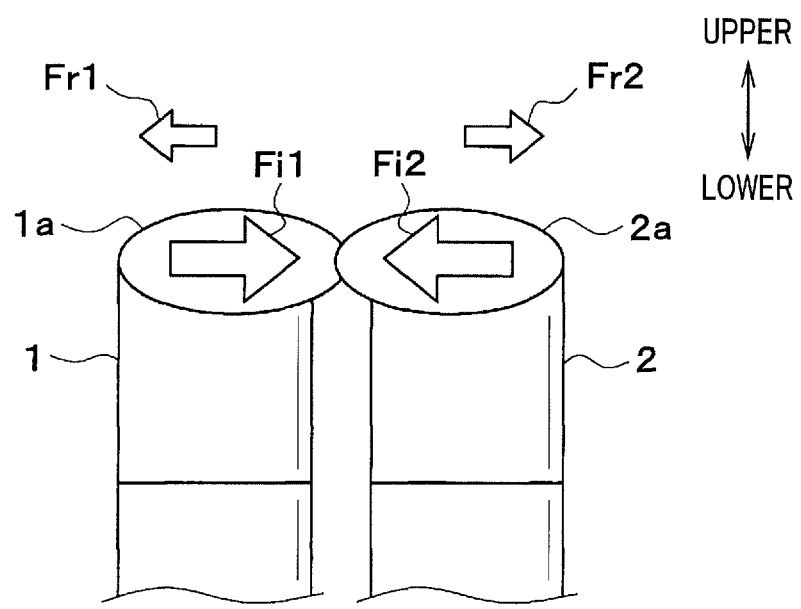
FIG. 6 is an explanatory diagram illustrating welding behaviors at a current drop step P3.

As shown in FIG. 6, since the welding current drops at the current drop step P3 compared to the current rise step P2, the electromagnetic forces are decreased. Accordingly, the repulsive forces Fr1 and Fr2 acting on the fused portions 1a and 2a, respectively, are also decreased.

Thus, the fused portions 1a and 2a will move in the directions of coming close to each other and thus inertia forces Fi1 and Fi2 will act on the fused portions 1a and 2a, respectively, in the directions of allowing them to approach one another. In other words, the inertia force Fi1 acts on the fused portion 1a on the work piece 1 to move the fused portion 1a in the direction of approaching the work piece 2. Similarly, the inertia force Fi2 acts on the fused portion 2a on the work piece 2 to move the fused portion 2a in the direction of approaching the work piece 1.

Figure 7:
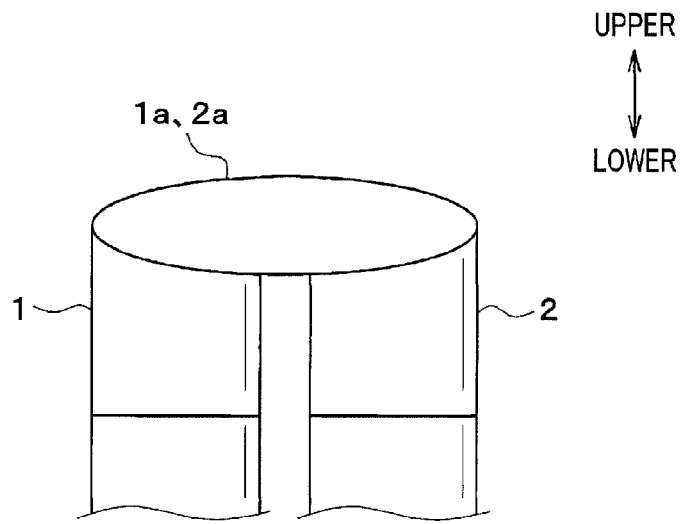
FIG. 7 is an explanatory diagram illustrating a state of fused portions at a second constant current step P1.

As a result, as shown in FIG. 7, the fused portions 1a and 2a form a bridge across the work pieces 1 and 2. Specifically, when the fused portions 1a and 2a are formed on both of the work pieces 1 and 2, respectively, the fused portions 1a and 2a will adhere to and be fused into each other. When the fused portion is formed on only one of the work pieces, the fused portion adheres to the work piece on the other of the work pieces.

If the inertia forces Fi1 and Fi2 acting on the fused portions 1a and 2a, respectively, are excessively large, the fused portions 1a and 2a would make a movement beyond the effect of surface tension and would drip off from the work pieces 1 and 2. Therefore, the welding current is set to a level of generating the inertia forces Fi1 and Fi2 which will allow the fused portions 1a and 2a to stay on the work pieces 1 and 2, respectively, by the effect of surface tension.

After the fused portions 1a and 2a have bridged the two work pieces 1 and 2, the repulsive forces Fr1 and Fr2 will no longer be generated. Therefore, when the second constant current step P1 is performed to restore the welding current, the state where the two work pieces 1 and 2 are bridged by the fused portions 1a and 2a is maintained as shown in FIG. 7.

In this way, the two work pieces 1 and 2 are bridged by the fused portions 1a and 2a and resultantly the work pieces 1 and 2 are joined to each other. Accordingly, the occurrence of separated fusion is minimized.

As will be understood from the foregoing description, the welding current is changed in the present embodiment to cause a sway in the fused portions 1a and 2a. Being swayed, the fused portions 1a and 2a form a bridge across the two work pieces 1 and 2.

In the present embodiment, since the work pieces 1 and 2 are each formed of oxygen-free copper, surface tension of the fused portions 1a and 2a is comparatively strong. The strong surface tension of the fused portions 1a and 2a will hardly allow the fused portions 1a and 2a to sway.

In light of this, at the current rise step P2 and the current drop step P3 of the present embodiment, the control waveform is shaped into a rectangular wave to ensure drastic variation of the welding current. Therefore, the repulsive forces Fr1 and Fr2 acting on the fused portions 1a and 2a, respectively, are greatly changed to reliably cause a sway in the fused portions 1a and 2a.

At the current changing steps P2 and P3 (current changing controls C2 and C3) of the present embodiment, the welding current is decreased so that the fused portion of at least one of the two work pieces will move toward the other work piece for adhesion to the fused portion of the other work piece or for adhesion to the other work piece itself.

Thus, the two work pieces 1 and 2 are bridged by the fused portion(s) to minimize the occurrence of separated fusion.

In the present embodiment, the current changing steps P2 and P3 (current changing controls C2 and C3) includes the current rise step P2 (current rise control C2) that increases the welding current and the current drop step P3 (current drop control C3) that follows the current rise step P2 (current rise control C2) and decreases the welding current.

Thus, since the welding current is greatly lowered, the fused portion of at least one of the two work pieces 1 and 2 is ensured to reliably move toward the other work piece.

In the present embodiment, the welding current, after being lowered at the current drop step P3 (current drop control C3), is restored to a level which is the level prior to performing the current rise step P2 (current rise control C2).

Accordingly, the increase in the amount of heat input accompanying the rise in the welding current at the current rise step P2 (current rise control C2) can be cancelled as much as possible by the decrease in the amount of heat input accompanying the drop in the welding current at the current drop step P3 (current drop control C3). Therefore, the amount of heat input is equalized with the heat input in the case where constant direct current is passed.

At the current changing steps P2 and P3 (current changing controls C2 and C3) of the present embodiment, the welding current is changed such that the fused portions 1a and 2a can stay on the work pieces 1 and 2, respectively, by the effect of surface tension.

Thus, the fused portions 1a and 2a are prevented from make a movement beyond the effect of surface tension and thus prevented from dripping off from the work pieces 1 and 2.

At the current changing steps P2 and P3 (current changing controls C2 and C3) of the present embodiment, the waveform of the welding current is shaped into a rectangular wave.

Accordingly, the welding current can be drastically changed and hence the fused portion of at least one of the two work pieces 1 and 2 can be reliably moved toward the other of the work pieces 1 and 2. For example, creating a rectangular wave is effective when the work pieces 1 and 2 are metals that can intensify surface tension of the fused portions 1a and 2a.

Second Embodiment

Figure 8:
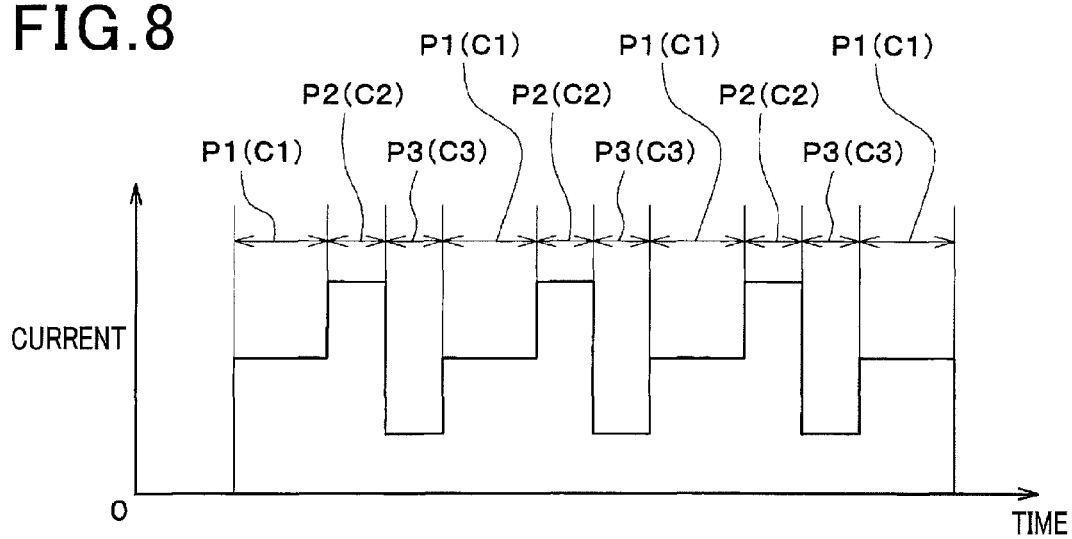
FIG. 8 is a current waveform diagram illustrating a control waveform that controls welding current by an arc welding apparatus according to a second embodiment of the present disclosure.

Referring now to FIG. 8, a second embodiment of the present disclosure is described. FIG. 8 is a current waveform diagram illustrating a control waveform created for the welding current by an arc welding apparatus according to the second embodiment.

In the first embodiment described above, the current rise step P2 and the current drop step P3 are performed once. However, as shown in FIG. 8, the current rise step P2 and the current drop step P3 are repeatedly performed for a plurality of times in the second embodiment.

When the current rise step P2 (current rise control C2) and the current drop step P3 (current drop control C3) are performed once, the fused portions 1a and 2a do not necessarily bridge the two work pieces 1 and 2. However, by repeatedly performing the current rise step P2 (current rise control C2) and the current drop step P3 (current drop control C3), the fused portions 1a and 2a are able to reliably bridge the two work pieces 1 and 2. Therefore, the occurrence of separated fusion is reliably minimized.

Third Embodiment

Figure 9:
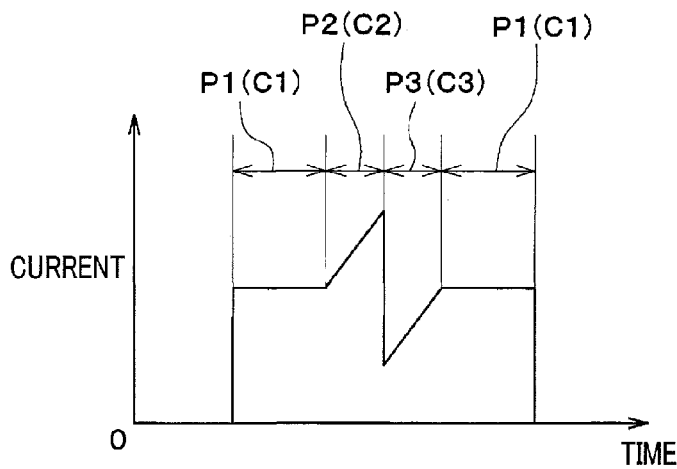
FIG. 9 is a current waveform diagram illustrating a control waveform that controls welding current by an arc welding apparatus according to a third embodiment of the present disclosure.

Referring to FIG. 9, a third embodiment of the present disclosure is described. FIG. 9 is a current waveform diagram illustrating a control waveform created for the welding current by an arc welding apparatus according to the third embodiment.

In the first embodiment described above, the control waveform of the welding current at the current rise step P2 and the current drop step P3 is shaped into a rectangular wave. In the third embodiment, however, as shown in FIG. 9, the control waveform of the welding current at the current rise step P2 and the current drop step P3 is shaped into a triangular wave.

In the present embodiment, the work pieces 1 and 2 are each formed of tough pitch copper. When the work pieces 1 and 2 are each formed of tough pitch copper, surface tension is weak in the fused portions 1a and 2a compared to the case where the work pieces 1 and 2 are each formed of oxygen-free copper.

Weak surface tension will easily allow the fused portions 1a and 2a to sway at the current rise step P2 and the current drop step P3. Accordingly, there is a high probability that the fused portions 1a and 2a may make a movement beyond the effect of surface tension to thereby drip off from the base materials 1 and 2, respectively.

In light of this, in the present embodiment, the control waveform is shaped into a triangular wave at the current rise step P2 (current rise control C2) and the current drop step P3 (current drop control C3). Accordingly, compared to the case where the control waveform is shaped into a rectangular wave, variation of the welding current is mitigated. In this way, variation of the repulsive forces Fr1 and Fr2 acting on the fused portions 1a and 2a, respectively, are appropriately minimized and thus the sway of the fused portions 1a and 2a is appropriately minimized.

Similar to the second embodiment, the occurrence of separated fusion is reliably minimized in the present embodiment as well by repeatedly performing the current rise step P2 and the current drop step P3 for a plurality of times.

Other Embodiments

The foregoing embodiments may be adequately combined. Further, the foregoing embodiments may be modified in various ways, for example, as provided below.

(1) The foregoing embodiments deal with examples in which the present disclosure is applied to TIG welding. However, the present disclosure may be applied to non-consumable electrode type arc welding, such as plasma welding.

(2) The foregoing embodiments deal with examples in which the present disclosure is applied to the welding between copper coils used for an SC (segment conductor) alternator. However, the present disclosure may be applied, for example, to the welding between a copper terminal and a lead such as of an alternator or a starter.

Specifically, in the foregoing embodiments, the two work pieces 1 and 2 are both the copper coils of an SC (segment conductor) alternator. However, the two work pieces 1 and 2 are not limited to these copper coils. For example, one of the work pieces 1 and 2 may be a copper terminal such as of an alternator or a starter, and the other of the work pieces 1 and 2 may be a lead such as of an alternator or a starter.

(3) In the foregoing embodiments, the control waveform of the welding current at the current rise step P2 and the current drop step P3 is shaped into a rectangular wave or a triangular wave. However, the control waveform of the welding current at the current rise step P2 and the current drop step P3 may be changed in various ways. For example, the control waveform of the welding current at the current rise step P2 and the current drop step P3 may be shaped into a sine wave.

What is claimed is:

1. A method for performing arc welding, the method comprising:
preparing two work pieces each having an upper portion located in an upper end thereof with respect to a vertical direction, two upper portions of the two work pieces being butted against one another in a horizontal direction that is perpendicular to the vertical direction;
preparing a welding electrode which is a non-consumable electrode used for performing arc welding to the two work pieces, the welding electrode being disposed to face the two work pieces;
applying welding current to the welding electrode so as to have the two work pieces welded;
performing a constant current step to make the welding current substantially constant;
directly after the constant current step, performing a current changing step that includes (i) performing a current rise step that raises an amount of the welding current, and (ii) directly after the constant rise step, performing a current drop step that lowers an amount of the welding current, the current changing step changing an amount of the welding current to be decreased so as to have a fused portion included in the upper portion of at least one of the two work pieces move toward the other work piece for adhesion to a fused portion of the other work piece or for adhesion to the other work piece itself,
wherein the constant current step includes producing electromagnetic forces and repulsive forces on the fused portions included in the upper portions of the two work pieces, surface tension maintaining the fused portions on the respective work pieces during application of the repulsive forces,
the current changing step includes (i) changing the electromagnetic forces in order to change the repulsive forces on the fused portions, (ii) changing the welding current such that the fused portions are swayed because of a change in the repulsive forces therebetween,
the current rise step includes increasing the electromagnetic forces to increase the repulsive forces on the fused portions, and
the current drop step includes decreasing the electromagnetic forces to decrease the repulsive forces on the fused portions in order to make the fused portions adhere to each other.

2. The method according to claim 1, wherein an amount of the welding current in the current rise step is higher than that of the constant current step, and an amount of the welding current in the current drop step is lower than that of the constant current step.

3. The method according to claim 1, wherein an amount of the welding current, after being lowered at the current drop step, is restored to a level which is the level prior to performing the current rise step.

4. The method according to claim 1, wherein a waveform of the welding current is shaped into a rectangular wave in the current changing step.

5. The method according to claim 1, wherein a waveform of the welding current is shaped into a triangular wave in the current changing step.

6. The method according to claim 1, wherein the current changing step is repeatedly performed for a plurality of times.

7. The method according to claim 1, wherein the work pieces are each formed of oxygen-free copper.

8. An apparatus for performing arc welding, the apparatus comprising:
- a non-consumable welding electrode;
- a welding power source configured to supply welding current to the non-consumable welding electrode so as to have two work pieces welded; and
- a control unit configured to control the welding current by (i) first controlling an amount of the welding current to be substantially constant, (ii) second, directly after the first controlling step, controlling a change in the welding current by controlling an amount of the welding current to be raised and (iii) then, directly after the second controlling step, controlling a change in the welding current by controlling an amount of the welding current to be lowered to change an amount of the welding current to be decreased so as to have the fused portion of at least one of the two work pieces move toward the other work piece for adhesion to the fused portion of the other work piece or for adhesion to the other work piece itself,
- wherein each of the two work pieces has a portion including a fused portion to be welded, portions of the two work pieces are butted against one another,
- controlling the amount of the welding current to be substantially constant includes producing electromagnetic forces and repulsive forces on the fused portions included in the upper portions of the two work pieces, surface tension maintaining the fused portions on the respective work pieces during application of the repulsive forces,
- controlling the change in the welding current includes (i) changing the electromagnetic forces in order to change the repulsive forces on the fused portions, (ii) changing the welding current such that the fused portions are swayed because of a change in the repulsive forces therebetween,
- controlling the amount of the welding current to be raised includes increasing the electromagnetic forces to increase the repulsive forces on the fused portions, and
- controlling the amount of the welding current to be lowered includes decreasing the electromagnetic forces to decrease the repulsive forces on the fused portions in order to make the fused portions adhere to each other.

9. The apparatus according to claim 8, wherein the control unit controls an amount of the welding current to be higher than an amount of the welding current when being controlled as substantially constant, and controls an amount of the welding current to be lower than an amount of the welding current when being controlled as substantially constant.

10. The apparatus according to claim 8, wherein the control unit controls, after controlling the amount of the welding current to be lowered, an amount of the welding current to be restored to a level which is the level prior to controlling the welding current to be raised.

11. The apparatus according to claim 8, wherein the control unit controls a waveform of the welding current to be shaped into a rectangular wave.

12. The apparatus according to claim 8, wherein the control unit controls a waveform of the welding current to be shaped into a triangular wave.

13. The apparatus according to claim 8, wherein the control unit controls, repeatedly for a plurality of times, an amount of the welding current to be raised and subsequently to be lowered.

14. The apparatus according to claim 8, wherein the work pieces are each formed of oxygen-free copper.

* * * * *